United States Patent [19]

Heinonen et al.

[11] Patent Number: 4,702,621
[45] Date of Patent: Oct. 27, 1987

[54] BEARING ARRANGEMENT FOR A FEEDING DEVICE FOR A DRILLING MACHINE

[75] Inventors: Jarmo Heinonen; Risto Wisakanto; Rolf Ström, all of Tampere, Finland

[73] Assignee: Oy Tampella AB, Tampere, Finland

[21] Appl. No.: 813,014

[22] Filed: Dec. 24, 1985

[30] Foreign Application Priority Data

Jan. 18, 1985 [FI] Finland .................................. 850232

[51] Int. Cl.⁴ ............................................. F16C 29/12
[52] U.S. Cl. ......................................... 384/37; 384/38; 384/39; 384/40
[58] Field of Search ................ 308/3 R, 3 A, 3.5, 5 R; 384/39, 37, 40, 38

[56] References Cited

U.S. PATENT DOCUMENTS 2,914,362 11/1959 Ott et al. ............................. 308/3 A
3,020,097 2/1962 Bullard et al. ...................... 308/3 R
4,222,461 9/1980 Gunti .................................. 308/3 R Primary Examiner—Lenard A. Footland
Attorney, Agent, or Firm—Ladas & Parry

[57] ABSTRACT

A bearing arrangement for a feeding device for a drilling machine, comprising a feeding beam (1) provided with longitudinal guides (6), a carriage supporting a drilling machine (3) and provided with guide surfaces in slidable engagement with the guides, and displacing means for displacement of the carriage along the guides. At least one guide surfce (5a) of the carriage is formed by a spacer (5) supported by the carriage. For automatical eliminatin of the clearance between the feeding beam and the carriage, the spacer is pressed against a wedging surface (8) provided on the carriage and extending essentially in parallel with the guide. The carriage is provided by means (9) for displacement of the spacer in between the guide surface (6a) of the guide of the feeding beam and the wedging surface (8) of the carriage so that the growth of clearance caused by wearing of the spacer is avoided as the wearing increases.

2 Claims, 7 Drawing Figures

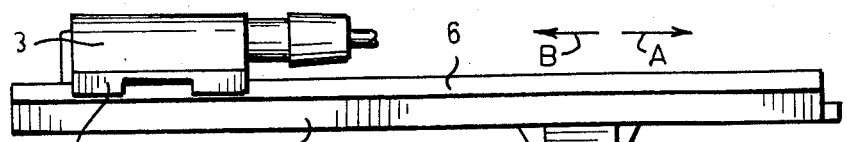
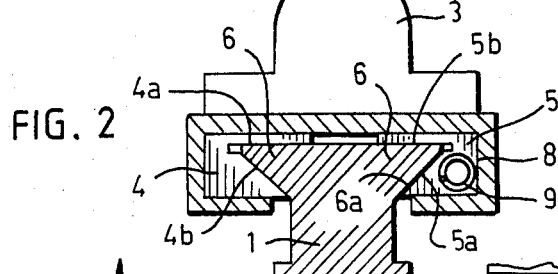
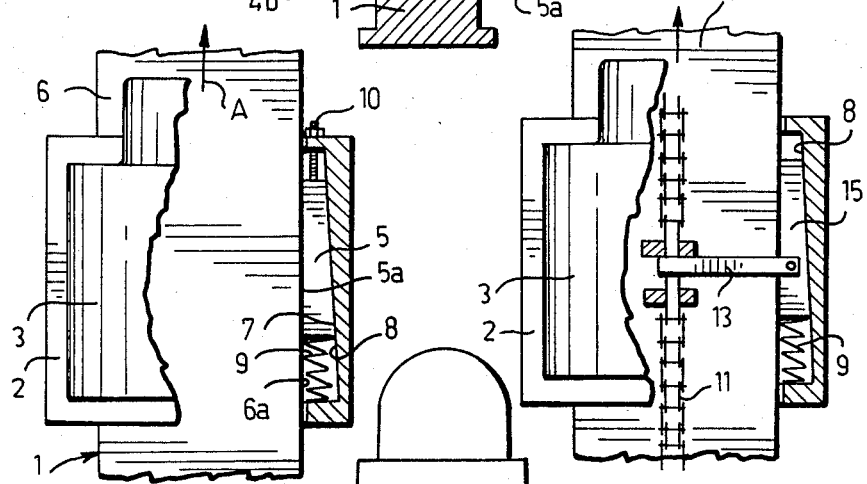
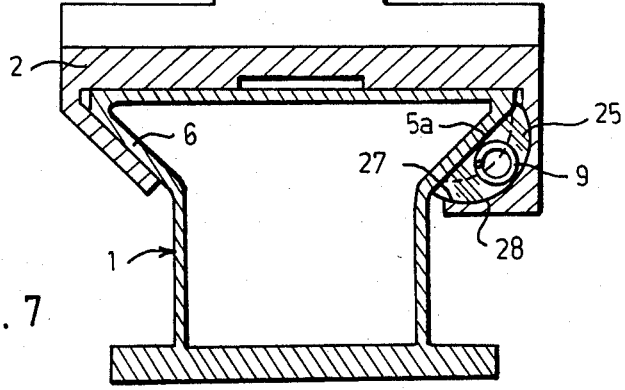

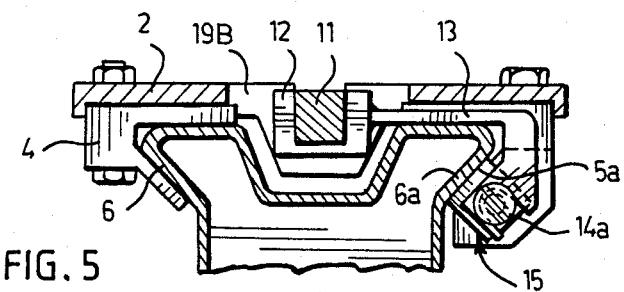
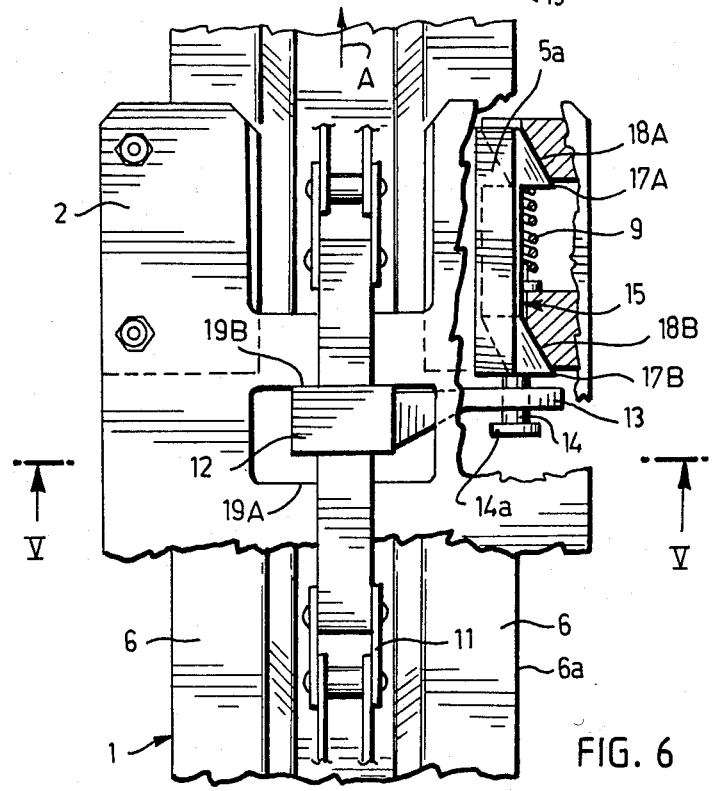
FIG. 5
FIG. 6

BEARING ARRANGEMENT FOR A FEEDING DEVICE FOR A DRILLING MACHINE

This invention relates to a bearing arrangement for a feeding device for a drilling machine, said feeding device comprising a feeding beam provided with longitudinal guides, at least one carriage displaceable on said guides for supporting of a drilling machine, said carriage being provided with guide surfaces in engagement with the guides, and displacing means for displacement of the carriage along said guides, whereby at least one guide surface of the carriage is formed by at least one spacer supported by the carriage.

The carriage is intended for displacement of the drilling machine including its drill rod towards the rock when the drilling process proceeds and for drawing of the drill rod out from the drill hole after the drilling of the hole has been completed. In beam-type feeding devices known at present, the carriage of the drilling machine is provided with slide blocks or rollers fastened on the carriage by means of spacing plates through screw locking. The clearance between the carriage and the feeding beam is adjusted by means of said spacing plates and/or by displacing the slide blocks in oblong holes, whereafter the slide blocks are locked by means of screws.

In bearing arrangements based on such a structure, the clearance, however, tends to change in the long run, when the screw locking of the slide blocks and the spacing plates is loosened or the slide blocks wear out. When the feeding beam gets distorted or the slide faces thereof are damaged, borers add spacing plates to such an extent that the carriage slides or rolls over such a point.

A too large clearance between the carriage and the feeding beam, however, causes several disadvantages. The straightness of the hole to be drilled suffers and the shank piece, the drilling machine and drill rods may be damaged. Problems arise in the automatization of the rod treatment. The drilling process is interrupted when the clearances are adjusted. Further, the slide blocks more rapidly wear down the guides of the feeding beam on account of the linear contact.

The object of the present invention is to provide a bearing arrangement which avoids the above-mentioned disadvantages and has a self-adjusting construction. This object is achieved by means of a bearing arrangement according to the invention, which is characterized in that said spacer is pressed against a wedging surface provided on the carriage and extending essentially in parallel with said guide, and that the carriage is provided with means for displacement of the spacer in between the guide surface of the feeding beam and the wedging surface of the carriage.

The bearing arrangement according to the invention is based on the idea that a wedging surface is provided for the spacer positioned between the carriage and the feeding beam in order to enable elimination of the clearance between the carriage and the feeding beam by displacing said spacer along the wedging surface by means of a suitable displacing means, such as a spring, a hydraulic cylinder or the like. Said displacing means can fully automatically press the spacer along the wedging surface so that the spacer moves against the guide of the feeding beam without any clearance, whereby the growth of the clearance caused by wearing is avoided as the wearing increases. The wedging surface also prevents the spacer from undesirably getting stuck during the return motion of the carriage, because a movement of the spacer along the wedging surface in the direction of the return motion correspondingly increases the clearance.

In the bearing arrangement according to the invention, the smallest and, if necessary, also the largest sliding or rolling clearance of the carriage and the feeding beam can be adjusted in a desired manner by means of an adjusting screw or the like which restricts the movement of the spacer.

It is possible to avoid that the spacer unintentionally gets stuck at the beginning of the return motion of the carriage by using a relatively obtuse angle for the wedging surface. This can be most advantageously effected by the use of two or more wedge surfaces in order to obtain a sufficient surface area. This can be further ensured by fastening the spacer on a displacing chain of the carriage in such a manner that the chain draws off the spacer when the return drawing movement begins.

By arranging the wedging surface in an inclined position with respect to the other guide surfaces of the carriage and the feeding beam, as seen in a cross-section of the feeding beam, the spacer removes the clearance both in the direction of the height and the breadth of the carriage. In a preferred solution, the spacer and the wedging surface are so constructed that the spacer is capable of pivoting around the longitudinal axis thereof supported by the wedging surface of the carriage. Thereby the spacer is always automatically positioned in parallel with the guide surface of the guide of the feeding beam in spite of the wearing.

The invention will be more closely described in the following with reference to the attached drawings, wherein FIG. 1 is a schematical side view of a feeding device of a drilling machine, FIGS. 2 and 3 schematically illustrate the operating principle of a bearing arrangement according to the invention as a vertical cross-section and correspondingly as a partial horizontal section seen from the top, FIG. 4 schematically illustrates the operating principle of a further developed embodiment of the bearing arrangement as a partial axial section seen from the top, FIGS. 5 and 6 illustrate in detail the structure of the embodiment of FIG. 4 as a vertical section and in a top view respectively, and FIG. 7 is a vertical cross-section of a third embodiment of the bearing arrangement.

The feeding device shown in FIG. 1 of the drawings comprises an elongated feeding beam 1 and a carriage 2 displaceable therealong, which carriage supports a drilling machine 3. The carriage is displaced along longitudinal guides provided on the feeding beam by means of a feeding chain described below: first in a drilling direction A for drilling of a hole in the rock and thereafter in the opposite direction B so as to draw the drill rod out from the drilled hole and to return the drilling machine to the starting position shown in FIG. 1 at the end of the feeding beam.

According to FIGS. 2 and 3, two spacers 4, 5 are mounted between the carriage and the feeding beam, which spacers form guide surfaces 4a, 4b and 5a, 5b, by means of which the spacers are pressed against the guides 6 of the feeding beam. The other spacer 5 is wedge-shaped and forms a sliding surface 7 which is pressed against a wedging surface 8 provided on the carriage. The angle between the guide surface 5a of the spacer and the sliding surface 7 is equal to the angle between the wedging surface of the carriage and the corresponding guide surface 6a of the guide of the feeding beam. The wedging surface of the carriage approaches the guide in the drilling direction A. A spring 9 is provided between the carriage and the spacer 5, which spring presses the spacer in the drilling direction with respect to the carriage. The angle of the wedging surface and the spring force of the spring are selected so that the spacer is prevented to get stuck when the carriage starts to move in the return direction B.

The bearing arrangement operates as follows:

The spring presses the spacer into the wedge-shaped gap between the guide of the feeding beam and the wedging surface of the carriage with a tightness determined by the spring force, whereby the spacer removes the clearance between the feeding beam and the carriage. When the guide surfaces get worn, the spacer is automatically pushed deeper between the beam and the carriage so that an accurate control of the carriage is maintained. When the carriage is drawn in the return direction, the spacer similarily ensures that the carriage slides along the feeding beam without any clearance. Because the wedging surface of the carriage is positioned obliquely with respect to the other guide surfaces 4a, 4b and 5b of the carriage, FIG. 2, the spacer eliminates the clearance both in the direction of the height and in the direction of the breadth of the carriage.

In FIG. 3, the carriage is provided with an adjusting screw 10, by means of which the protrusion of the spacer into the wedge-like gap between the carriage and the feeding beam can be limited, thus obtaining a desired clearance between the carriage and the beam. Correspondingly, it is possible to mount an adjusting screw also on the opposite side of the spacer in order to limit the movement of the spacer in both directions.

In the embodiment of FIGS. 4–6, the spacer 15 is connected to a feeding chain 11 known per se which is provided for the carriage for the displacement thereof along the feeding beam. For this purpose, the chain comprises a shoulder 12 which is provided with an arm 13 which, in turn, is in sliding engagement with a stud 14 projecting from the spacer. The carriage is provided with two abutments 19A, 19B between which the shoulder of the chain is positioned. The distance between the abutments is such that when the chain moves in the return direction, the shaft is displaced and contacts the head 14a of the stud before the shoulder touches the abutment 19A and when the chain moves in the drilling direction, the shoulder contacts the other abutment 19B, thus preventing the arm from touching the spacer. The spring 9 provided in the carriage continuously presses the spacer in the drilling direction. The stud of the spacer and the abutments of the carriage are arranged in such a manner with respect to each other that the shaft draws the spacer off the gap between the carriage and the feeding beam but only to such an extent that the spacer is positively prevented to get unintentionally stuck during the return movement, still maintaining an efficient guiding of the carriage along the feeding beam.

According to FIGS. 5 and 6, the wedging surface of the carriage is formed by two wedge surfaces 18A, 18B positioned one after another in the direction of movement, whereby the spacer is provided with corresponding sliding surfaces 17A, 17B. Such an embodiment increases the area of the wedging surface.

In the embodiment of FIG. 7, the sliding surface 27 of the spacer 25 as well as the wedging surface 28 of the carriage are formed by cylindrical surfaces which are essentially of equal radius and coaxial. The axes of the surfaces extend obliquely with respect to the guide surface 5a of the spacer so that the spacer can pivot around the longitudinal axis thereof on the wedging surface. Irrespective of the wearing, the guide surface 5a of the spacer is thereby always positioned in parallel with the surface of the guide 6 of the feeding beam.

The drawings and the description related thereto are only intended to illustrate the idea of the invention. In its details, the bearing arrangement according to the invention may vary within the scope of the claims. The spacer has been presented above as a slide wedge, the slide surface of which is pressed against the guide of the feeding beam. It is also possible to construct the spacer as a roller wedge provided with one or more rollers which are pressed against the guide of the feeding beam and roll therealong. In place of a spring, a hydraulic cylinder, e.g., can as well be used as means for pushing or drawing the spacer.

The drilling machine can be supported by means of one or more carriages fastened apart from each other at different places of the drilling machine. The guide surface of the carriage can be formed by one or more spacers or wedges.

We claim:

1. A bearing arrangment for a feeding device of a drilling machine, comprising a feeding beam having a plurality of longitudinal guides, at least one carriage being displaceable on said guides for supporting of the drilling machine, said carriage being provided with a plurality of guide surfaces for engagement with the guides, moving means for movement of the carriages along said guides, at least one guide surface of the carriage is formed by at least one spacer supported by the carriage, the spacer being pressed against at least one wedging surface provided within the carriage and extending in a substantially parallel direction to said at least one longitudinal guide, the wedging surface approaches a guide surface of the guide in a drilling direction of the carriage.

the carriage having displacing means for displacement of the spacer between the guide surface of the feeding beam and the wedging surface of the carriage, said displacing means automatically pressing the spacer along the wedging surface enabling the spacer to move along said longitudinal guide without any substantial clearance, and whereby a growth of the clearance caused by wearing of the spacer and the guide is avoided as the wearing increases, said displacing means being a spring mounted between the carriage and the spacer, said spring displacing the spacer with respect to the carriage in the drilling direction.

2. A bearing arrangement for a feeding device of a drilling machine, comprising a feeding beam having a plurality of longitudinal guides, at least one carriage displaceable on the guides for supporting the drilling machine, the carriage being provided with a plurality of guide surfaces for engagement with the guides, moving means for movement of the carriage along the guides, at least one of the guide surfaces of the carriage being formed by at least one spacer supported by the carriage, the spacer being pressed against at least one wedging surface provided within the carriage and extending substantially parallel to the longitudinal guides, the wedging surfaces approaching a guide surface of the guides in a drilling direction of the carriage, the carriage having displacing means for displacement of the spacer between the guide surface of the guides of the feeding beam and the wedging surface of the carriage, the displacing means comprising spring means mounted between the carriage and the spacer for springlike displacement of the spacer with respect to the carriage in the drilling direction.

* * * * *